June 3, 1958 R. D. KIRK 2,837,342
CHILD'S VEHICLE OF THE VELOCIPEDE TYPE
Filed Dec. 28, 1955 3 Sheets-Sheet 1

INVENTOR.
RALPH D. KIRK
BY
B. P. Fishburne, Jr.
ATTORNEY

June 3, 1958 R. D. KIRK 2,837,342
CHILD'S VEHICLE OF THE VELOCIPEDE TYPE
Filed Dec. 28, 1955 3 Sheets-Sheet 2
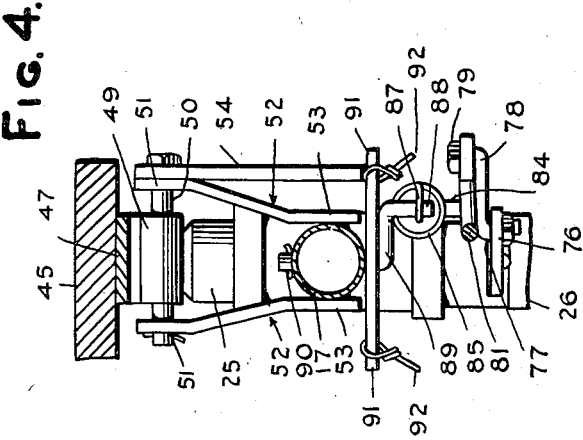
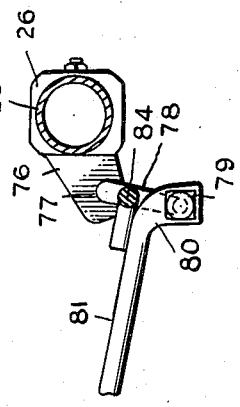
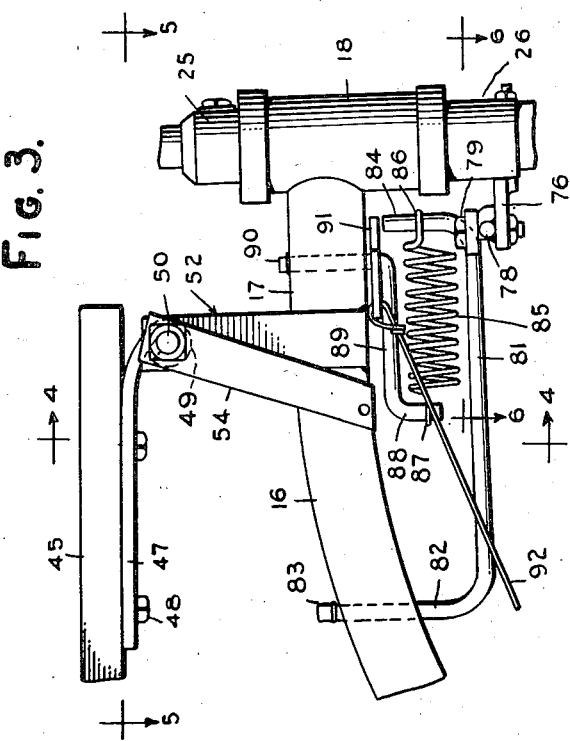
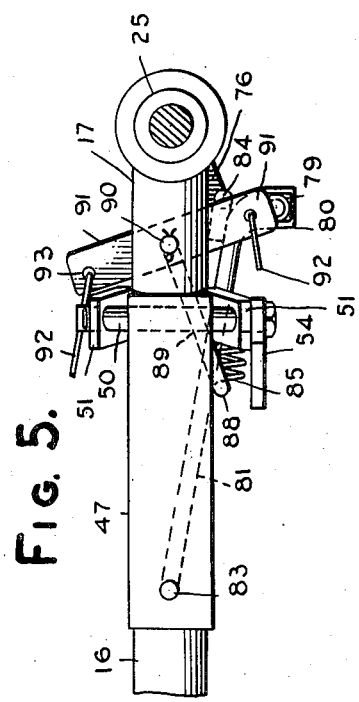
INVENTOR.
RALPH D. KIRK
BY
ATTORNEY June 3, 1958  R. D. KIRK  2,837,342
CHILD'S VEHICLE OF THE VELOCIPEDE TYPE
Filed Dec. 28, 1955  3 Sheets-Sheet 3
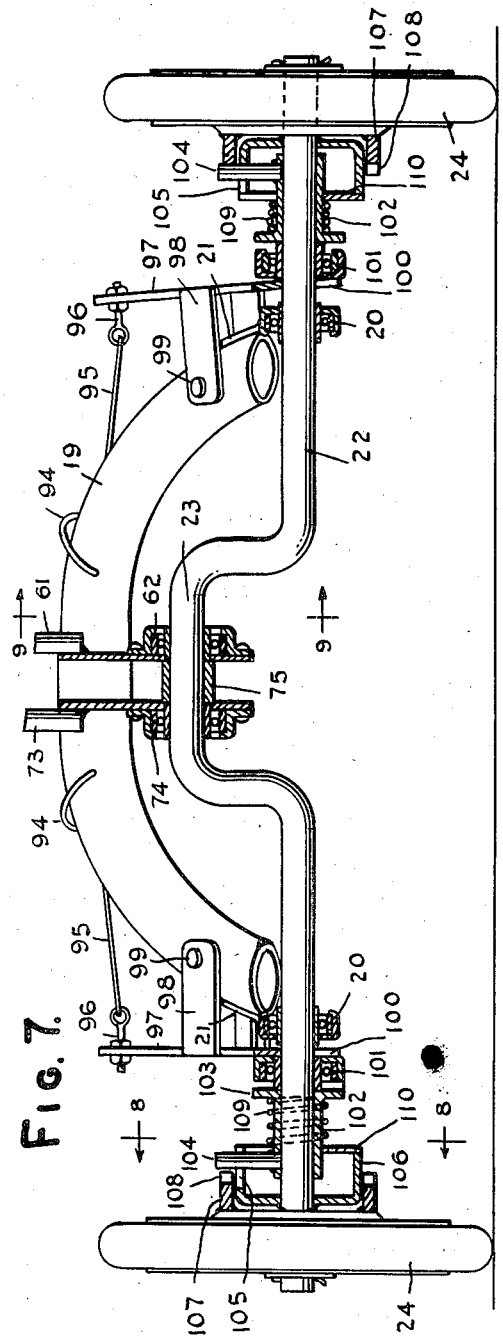

United States Patent Office 2,837,342
Patented June 3, 1958

2,837,342

CHILD'S VEHICLE OF THE VELOCIPEDE TYPE

Ralph D. Kirk, Heath Springs, S. C., assignor of one-half to Roy O. Small, Heath Springs, S. C.

Application December 28, 1955, Serial No. 555,931

3 Claims. (Cl. 280—1.189)

The present invention relates to a child's vehicle of the velocipede type.

An object of the invention is to provide a child's velocipede which simulates a miniature horse, or the like, and which is so constructed that the weight of the child upon the oscillating body portion of the device aids in propelling the same, in conjunction with novel and simplified foot pedal operating means.

A further object of the invention is to provide in a vehicle of the above-mentioned character novel means controlled by the front steering wheel of the vehicle for selectively causing one or the other of the rear wheels to have a positive driven connection with the rear driving axle, and at the same time allowing the other rear wheel to turn freely with respect to the axle.

A further important object is to provide separate driving connecting means between the child supporting body portion of the vehicle, and between the foot pedal means and the rear driving axle, said separate means being arranged so that neither means is positioned at dead center with respect to the driving axle while the other means is at dead center, whereby the rear axle is continuously driven by the weight of the child on the body portion and by the operation of the foot pedal means.

A further object is to provide resilient means to assist in the elevating of the child supporting body portion, and thereby aiding in propelling the vehicle.

A still further object is to provide a child's vehicle of the above-mentioned character which will simulate the action of a galloping horse or the like.

Other objects and advantages of the invention will be apparent during the course of the following description.

Figure 1:
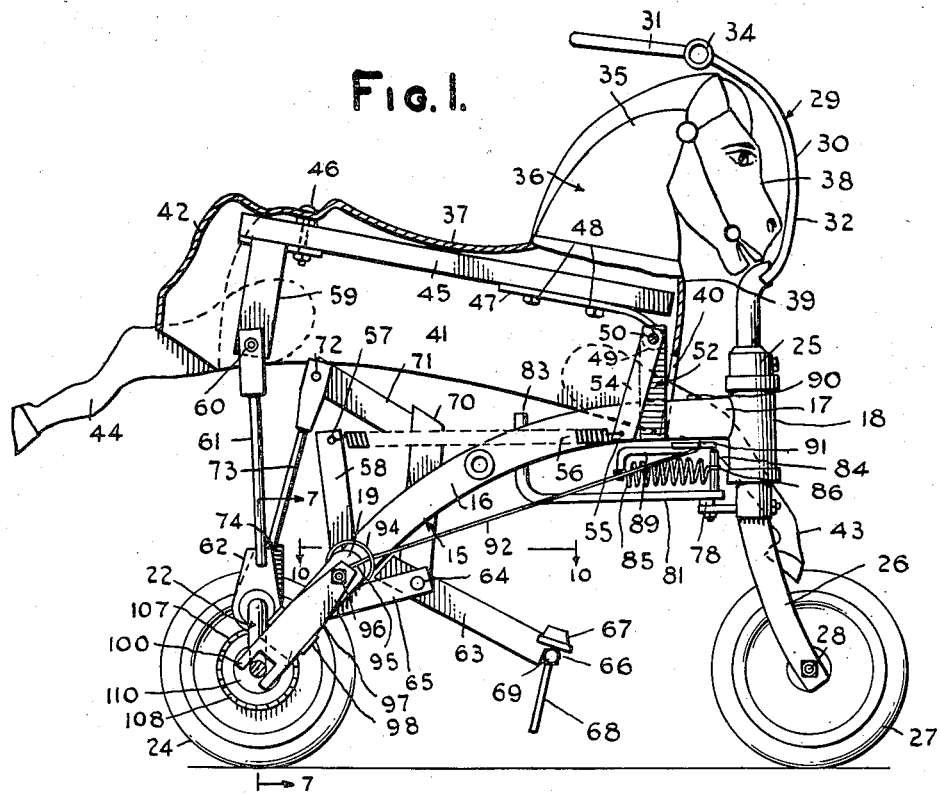
Figure 2:
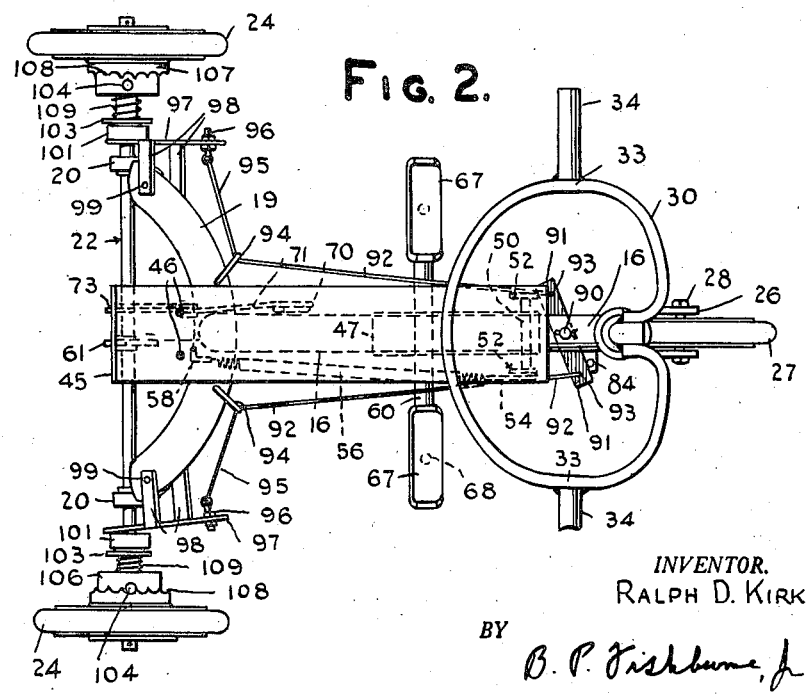

In the accompanying drawings, forming a part of this application, and in which like numerals are employed to designate like parts throughout the same, Figure 1 is a side elevation of a child's vehicle embodying the invention, with parts broken away and parts in section, Figure 2 is a plan view of the vehicle with the horse simulating body portion removed for the purpose of illustration, Figure 3 is an enlarged fragmentary side elevation of front steering mechanism and associated elements, Figure 4 is a transverse vertical section taken on line 4—4 of Figure 3, Figure 5 is a fragmentary horizontal section taken substantially on line 5—5 of Figure 3, Figure 6 is a fragmentary horizontal section taken on line 6—6 of Figure 3, Figure 7 is an enlarged transverse vertical section taken on line 7—7 of Figure 1, parts omitted, Figure 8 is a transverse vertical section taken on line 8—8 of Figure 7, Figure 9 is a similar section taken on line 9—9 of Figure 7, and, Figure 10 is an enlarged fragmentary horizontal section taken substantially on line 10—10 of Figure 1.

In the drawings, wherein for the purpose of illustration is shown a preferred embodiment of the invention, the numeral 15 designates generally a main rigid frame for the vehicle, including a longitudinal inclined or curved bar 16 having a substantially horizontal forward portion 17, as shown. Rigidly secured to the forward end of the frame bar 16 is a vertical sleeve or hub 18 to receive a vertical steering column, to be described. The rear end of the frame bar 16 is arranged at a substantially lower elevation than the forward end 17, and has rigidly secured to it, by welding or the like, a transverse forwardly inclined frame bar 19, which is preferably curved or bowed upwardly, as shown. The transverse frame bar 19 extends equidistantly beyond opposite sides of the bar 16, and with the bar 16 and vertical hub 18 makes up the main rigid frame 15.

A pair of ball bearings 20 or the like, are suitably rigidly secured as by strap extensions 21 to the lower ends of the curved transverse frame bar 19, Figure 7. Freely journaled within the ball bearings 20 is a rear transverse driving axle 22 having a central eccentric crank portion 23, as shown. Rear wheels 24 are freely journaled upon the opposite ends of the driving axle 22, and these wheels support the driving axle and the rear end of the vehicle.

A front vertical steering column 25 is journaled within the vertical hub or sleeve 18 in a conventional manner, and extends above and below the same as shown in Figure 1. The lower end of the steering column carries a pair of spaced arms 26 constituting a fork, rigidly secured thereto, and a front wheel 27 is journaled between the lower ends of the fork for rotation as at 28. The upper end of the vertical steering column 25 has handle bar means 29 rigidly secured thereto, as by welding, and this handle bar means comprises a relatively large open loop 30 which is upwardly and rearwardly directed and preferably curved as shown in Figure 1. The top portion 31 of the loop 30 may be generally horizontal, as shown, whereas its lower portion 32 is generally vertical. The sides 33 of the loop 30 are spaced a considerable distance from the opposite sides of longitudinal frame bar 16, Figure 2, and the entire loop is substantially stiff or rigid, being formed of heavy wire, metal rod stock or the like. The loop 30 is provided upon opposite sides and near its top with handles 34 for use by the child for turning the steering column 25 and steering the vehicle. The purpose of the large open loop 30 is to provide clearance within the loop and between the handles 34 for the head portion 35 of a horse simulating body portion 36, upon which the child sits when using the vehicle.

The body portion 36 is in the form of a hollow shell of light weight plastics material, or the like, and is preferably quite stiff and sturdy. It includes a generally horizontal seat or saddle portion 37 and the head portion 35 previously mentioned. The head 38 proper is arranged close to and rearwardly of the loop 30 and just below the upper portion 31 thereof, as shown in Figure 1. A front generally vertical wall 39 of the body portion 36 is spaced rearwardly of the steering column 25 and may be slotted at its lower end, as at 40, to receive the forward portion 17 of the frame bar 16 and provide clearance for the same as the body portion 36 oscillates or swings vertically about its forward end in a manner to be described. The generally vertical side walls 41 of the body portion 36 are spaced somewhat from the opposite sides of the bar 16, so that this bar as well as certain other operating elements may enter between the side walls 41 as the body portion 36 oscillates upwardly and downwardly. The rear wall or tail portion 42 of the body portion is arranged above or somewhat rearwardly of the rear driving axle 22. The body portion 36 preferably has pairs of leg simulating elements 43 and 44 rigidly secured to its opposite sides by any suitable means near its forward and rear ends, as shown in Figure 1. The bottom of the body portion 36 is preferably entirely open. While the body portion 36 shown in the drawings simulates a horse, and may be decorated or colored in any desired manner, still it should be understood that the body portion may be formed to represent any other desired animal, configuration, or if preferred may simply form a suitable saddle or seat member for the child to sit upon.

The body portion 36 is rigidly secured to a generally horizontal longitudinal member or bar 45, which is arranged within the same and extends longitudinally thereof throughout substantially its entire length, Figure 1. The bar 45 is disposed close to the upper wall or saddle portion 37, in underlying relation thereto, and the rear end portion of the bar 45 is rigidly secured to the body portion 36 as by bolt means 46, or the like, rearwardly of saddle portion 37. Near its forward end, the bar 45 has a longitudinal strap or plate 47 rigidly secured to its lower side, as at 48. The forward extremity of strap 47 is directed downwardly somewhat and formed to provide a transverse horizontal knuckle or sleeve 49, integral therewith, and receiving a transverse horizontal pin 50, rigidly secured therein by any suitable means. The pin 50 projects beyond the opposite ends of the knuckle 49, Figure 4, and has its ends rotatably received within apertures formed through the top vertical extensions 51 of a pair of generally vertical bracket members 52, which extend downwardly from the pin 50 and have their lower vertical portions 53 rigidly secured as by welding to opposite sides of bar portion 17, Figures 1 and 4. The bracket members 52 are fixed and rigid, and the pin 50 is adapted to rotate within the apertures of the extensions 51. The strap 47, pin 50 and bracket members 52 are arranged inside of the forward portion of body portion 36, near its forward end 39, as shown in Figure 1.

Outwardly of one bracket member 52, the pin 50 has a depending generally vertical arm or lever 54 rigidly secured thereto to turn therewith, and the lower end of this arm 54 extends near or slightly below the bottom of the body portion 36 at one side of the bar 16. The lower end of arm 54 is connected at 55 with a rather strong substantially horizontal rectractile coil spring 56, which extends rearwardly adjacent the bar 16 and has its rear end secured at 57 to an upstanding rigid arm 58, having its lower end rigidly secured as by welding to the transverse frame member 19, adjacent one side of the bar 16. It may be seen that the spring 56 exerts a constant pull upon the arm 54, tending to turn the same clockwise in Figure 1 for thus turning the pin 50 and strap 47 clockwise. This will tend constantly to elevate the rear end of body portion 36, and associated elements, about the axis of pin 50.

Near its rear end, the bar 45 has a depending bracket 59 rigidly secured thereto within the body portion 36, and the lower end of bracket 59 is pivotally secured at 60 to the upper end of a rod or pitman 61, having a ball bearing unit 62 or the like rigidly secured to its lower end and rotatably receiving the crank 23 of driving axle 22, Figure 7. There is thus a positive driving connection between the rear end of bar 45 and the rear driving axle 22, as above described, and the weight of the child upon the body portion 36 will serve to drive or propel the vehicle through the medium of crank 23 and associated elements, as will be further described.

There is also provided foot pedal means, separate from the means previously described, for propelling the vehicle. Such means comprises a vertically swingable arm 63, arranged below the bar 16 near its rear end, and having its rear end pivoted at 64 between a pair of inclined brackets 65, which are rigidly secured by welding or the like to the transverse frame bar 19, upon opposite sides of the bar 16. The forward end of the arm 63 has a horizontal transverse cross bar 66 rigidly secured thereto, as by welding, and this cross bar extends upon opposite sides of the body portion 36 as shown in Figure 2. Near its opposite ends, the cross bar 66 has a pair of vertically adjustable pedal members 67 mounted thereon, and each pedal 67 carries a depending shaft 68, rigid therewith and engaging through a transverse opening in the cross bar 66 and locked therein in the selected vertically adjusted position by means of a set screw 69, having screw-threaded engagement within a screw-threaded opening formed in the respective end of the cross bar 66. By this means, the pedals 67 may be adjusted vertically with respect to the cross bar 66 so that the child's feet may properly reach them when the child is seated upon the body portion 36.

The arm 63 is adapted to swing vertically about the pivot 64, and the rear end of the arm 63 has an upstanding arm 70 rigidly secured thereto for forming therewith a bell crank. The arm 70 is provided at its top with a rearward extension 71, rigidly secured thereto and extending somewhat above the top of the member 58 as shown in Figure 1. The arms 70 and 71 are disposed near the side of the bar 16 remote from the member 58, and the arm 71 may be parallel with lever 63. The rear end of arm 71 is pivoted at 72 to a depending rod or pitman 73 having a ball bearing unit 74, or the like, suitably rigidly secured to its lower end and receiving the crank portion 23, Figure 7. A tubular spacer 75 may be mounted upon crank portion 23 between the bearing units 62 and 74, as shown, to maintain the bearing units properly spaced.

An important feature of this invention resides in the fact that the pitmans or crank operating elements 61 and 73 never reach dead center with respect to the crank 23 at the same time. That is to say, when the pitman 61 is on dead center as approximately shown in Figure 1, pitman 73 is passed dead center and vice versa. With this arrangement, either the weight of the child on the body portion 36 or the operation of the foot pedal means will be serving at all times to turn the crank 23 for driving or propelling the vehicle, and there will never be an instance when both driving means are at dead center with respect to the crank 23.

Means are provided in conjunction with the steering column 25 to maintain one rear wheel 24 in positive driven engagement with the shaft 22 at all times, and to selectively disengage one rear wheel from the shaft 22 when the vehicle is turned in either direction, so as to provide differential means whereby turning of the vehicle cannot cause either of the rear wheels to skid or bind upon turning. Such means comprises an apertured lug or element 76, rigidly secured to the rear side of steering column 25 near the top of the fork 26, for pivotal connection at 77 with a short horizontal link 78, having its opposite end pivoted at 79 to a forward lateral extension 80 of a rearwardly extending substantially horizontal rod 81, arranged below the frame bar 16. At its rear end, the rod 81 has an upturned extension 82 pivoted within an opening 83 formed in the frame bar 16, near its longitudinal center, so that the rod 81 is adapted to swing horizontally about the axis of the rear vertical extension 82. At its forward end, adjacent the extension 80, rod 81 also has a short upturned portion 84 rigidly secured thereto. A horizontal strong retractile coil spring 85 has its forward end secured at 86 to the upturned portion 84, and its rear end secured at 87 to a depending extension 88 of a horizontally swingable link 89, disposed above the spring and in turn having a forward vertical extension 90, pivotally secured within a vertical opening formed through frame bar portion 17. The spring 85 and link 89 are arranged directly above the rod 81, Figure 3. A horizontal transverse crosshead or plate 91 is rigidly secured by welding or the like near its longitudinal center to the pivotal extension 90, and extends underneath of the bar portion 17 and beyond opposite sides of the same, Figure 5. The crosshead 91 is arranged just above the top of extension 84, as shown in Figure 3. The arrangement is such that turning of the steering column 25 and lug 76 causes the short link 78 to swing the horizontal rod 81 horizontally about its rear pivot extension 83. When this occurs, the upstanding extension 84 shifts laterally with the forward end of the strong spring 85, and the spring is further tensioned and causes the horizontal link 89 to swing horizontally upon its pivot 90 for swinging the crosshead 91 horizontally with the pivot 90.

A pair of cables 92 have their forward ends secured at 93 near the ends of the crosshead 91, and these cables extend rearwardly upon opposite sides of the frame bar 16 and pass through guide rings 94 which are secured to the transverse frame bar 19, near and outwardly of the brackets 65. From the guide rings 94, the rear portions of the cables extend laterally outwardly at 95 for connection at 96 with the tops of inclined operating levers 97. These operating levers 97 are provided with lateral extensions 98, pivoted at 99 upon the transverse frame bar 19 near its opposite ends. The operating levers 97 are thus swingable bodily about their pivots 99, in response to pulls upon the cables 92, as caused by turning of the crosshead 91.

The lower ends of levers 97 are bifurcated at 100 for engagement over the shaft 22, outwardly of the shaft bearings 20. Outwardly of the levers 97, collars 101 in the form of ball bearings or the like are freely slidable upon the shaft 22 under the influence of pivoted levers 97. Outwardly of the collars 101, sleeves 102 are slidably mounted upon the shaft 22, and these sleeves have flanges 103 at their inner ends to be engaged by the collars 101. The sleeves 102 have radial pins 104 rigidly secured thereto, and extending slidably through slots 105 formed in cylindrical drum elements, rigidly secured to the shaft 22 to turn therewith, near and inwardly of the wheels 24. The sleeves 102 and pins 104 are shiftable longitudinally of shaft 22 with respect to drum elements 106 which are fixed upon the shaft. The pins 104 in all adjusted positions are within the slots 105, so that rotation of the drum elements 106 with the shaft 22 will impart rotation to the pins 104 with sleeves 102.

The wheels 24 are freely rotatably mounted on shaft 22, as previously mentioned. Inwardly directed cylindrical sleeves or clutch elements 107 are rigidly secured to the inner sides of the wheels 24 and engage over the drum elements 106 in concentrically spaced relation thereto, and the inner ends of sleeves 107 are provided about the circumference of the sleeves with a plurality of circumferentially equidistantly spaced notches 108. Any of these notches 108 is adapted to receive the pin 104 when such pin is shifted outwardly upon the shaft 22, the notch 108 being in registration with the slot 105. Compressible coil springs 109 surround the sleeves 102 and have their ends bearing respectively against the flanges 103 and the inner sides 110 of the drum elements. The arrangement is such, that the springs 109 normally urge the sleeves 102 inwardly against the collars 101, and maintain the pins 104 free of engagement with the notches 108, thereby allowing the wheels 24 to rotate freely. However, when either collar 101 is shifted outwardly by one of the levers 97 rocking upon its pivot 99, the corresponding sleeve 102 and pin 104 will be shifted outwardly and the pin 104 will engage within one notch 108 so that the wheel 24 will be locked to the shaft 22 for rotation therewith.

Whenever the steering column 25 is turned by the handle bar means 29 in either direction for turing the vehicle, the lug 76, short link 78 and rod 81 will be actuated, and the rod 81 will swing horizontally on its pivot 82 to one side or the other of dead center with respect to the strong spring 85 and pivoted element 89. When this occurs, the spring 85 will turn the element 89 upon its pivot 90 in one direction for likewise turning or swinging the crosshead 91 in one direction. This action will cause one of the cables 92 to become taut, while relaxing or allowing slack to develop in the opposite cable 92. The taut cable will cause the corresponding lever 97 to have its upper end swung inwardly toward the center of the vehicle and its lower bifurcated end swung outwardly along shaft 22 for shifting the corresponding pin 104 into driving engagement with one of the notches 108 of the clutch element 107. The corresponding wheel 24 will be locked to the drive shaft 22 for rotation therewith, and the vehicle will turn or pivot about this wheel 24, and the same wheel will be positively driven by the shaft 22 for propelling the vehicle around the turn.

Simultaneously, the other lever 97 connected with the relaxed cable 92 will be in the upright or unpivoted position, Figure 7, and the corresponding spring 109 will maintain its sleeve 102 and the pin 104 free of engagement with the other rear wheel 24, and this wheel will be freely rotatable with respect to shaft 22 and will not drag or skid as the vehicle rounds the turn. The arrangement thus provides a differential mechanism for the rear wheels to enable the vehicle to turn without dragging or skidding one rear wheel.

When the vehicle is traveling in a straight path, and the handle bar means and steering column 25 are in the neutral or straight-ahead position shown in the drawing, the elements 76 and 78 and the rod 81 will be positioned to cause the spring 85 through the medium of the elements 89 and 91 to maintain the right hand cable 92, Figure 7, under tension while the left hand cable, Figure 7, is relaxed. The right hand lever 97 will be pivoted as in Figure 7 for shifting the corresponding pin 104 into driving engagement with the right hand rear wheel 24. At this time, while the vehicle is moving in a straight path, the left hand rear wheel will be freely rotatable with respect to the shaft 22, since the corresponding left hand cable 92 is relaxed. It is thus seen, that one of the rear wheels 24 is positively driven by the shaft 22 for propelling the vehicle in a straight path, and one or the other of the rear wheels is positively driven when the vehicle rounds a curve in either direction. There is thus no time during which both rear wheels are free from driven engagement with the shaft 22, and the vehicle may always be propelled or driven in the desired direction by the combined action of the foot pedal means and the weight of the child upon the body portion 36. Likewise, there is no time or condition under which both rear wheels are simultaneously locked to the drive shaft 22, so that the vehicle may be steered in any direction without causing skidding or dragging of either rear wheel.

It is to be noted that the turning of the steering column 25 with the lug 76 causes the elements 78 and 81 and the extension 84 to shift the spring 85 laterally about its rear end 87, and when this occurs, the spring 85 functions to swing the elemnt 89 and the crosshead 91 upon the pivot 90 for tensioning or slackening the cables 92 and operating the rear wheel clutch devices. It is the spring 85 which actually does the work of engaging and disengaging the rear wheel clutch devices, although it is the steering column and associated linkage which initially positions the spring 85 to do its work.

When the child is seated upon the body portion 36, its weight tends to force the rear end of the bar 45 downwardly and to pivot the forward end of this bar and the body portion upon the pivot pin 50. Through the medium of pitman 61 and crank 23, the vehicle will be propelled by the weight of the child, and the spring 56 will aid the bar 45 and body portion in rising or returning to the position of Figure 1, each time that the weight of the child swings the body portion downwardly. Simultaneously with this, the child's feet on the pedals 67 will oscillate the bell crank including arms 63 and 70, and the arm 71 and pitman 73 will further actuate the crank 23 for propelling the vehicle. Since the pitmans 61 and 73 are never on dead center at the same time, with respect to the crank 23, as previously explained, the propelling action of the foot pedal means and the weight of the child on the body portion 36 will serve independently as separate or additive forces for propelling the vehicle, and much less effort on the part of the child for propelling the vehicle will be required than would normally be the case if only the foot pedal means or the means actuated by the weight of the child were provided. In other words, the separate driving or propelling means will operate in conjunction and with a minimum of effort by the child or operator for propelling the vehicle.

It is thus seen that there is provided a child's vehicle of the velocipede and hobbyhorse type, in which a horse simulating body portion upon which the child sits oscillates vertically to simulate a galloping action of the horse, and this action constitutes one propelling means or system for the vehicle. There is also a separate pedal means independent of the body portion and working in conjunction therewith for propelling the vehicle and the pedal propelling means and body portion propelling means are never on dead center at the same time with respect to the crank of the driving axle 22. There is also provided a novel rear wheel differential system operated by the front steering column for enabling the vehicle to round turns without driving one of the rear wheels, and this system includes means for maintaining one rear wheel in positive driven engagement with the rear driving axle at all times.

It is to be understood that the form of the invention, herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. A vehicle of the velocipede type comprising a frame, front steering wheel means connected with the frame and supporting it and including a rotary steering column, a rear axle journaled upon the frame and having a crank part for turning the rear axle, rear wheels journaled upon said rear axle and supporting it, separate movable clutch means associated with the rear axle and shiftable into and out of driving engagement with said rear wheels, a horizontally swingable element secured to said steering column for movement therewith, a short link pivoted to said element and swingable horizontally with respect thereto, a relatively long rod arranged substantially horizontally and having its forward end pivoted to said short link and its rear end pivoted to said frame and having an upturned part near its forward end, a substantially horizontal link arranged above said rod and pivoted to the frame and having an end portion to swing horizontally, a retractile spring secured to and connecting said end portion of the last-named link and said upturned part, a horizontally swingable crosshead secured to said substantially horizontal link to swing horizontally therewith, and cable means secured to the ends of said crosshead and connected with the movable clutch means to actuate the latter when the steering column is turned.

2. A child's vehicle comprising a supporting frame, front wheel steering means for the supporting frame, rear wheel means for the frame including a driving axle having a crank portion, a generally horizontal vertically swingable child supporting body portion pivoted near its forward end to the frame and being generally coextensive lengthwise with said frame, a first generally vertical pitman having its lower end connected with said crank portion and extending above the same and having its upper end pivoted to said body portion near the rear end of the latter, a companion generally vertical pitman having its lower end connected with the crank portion and extending thereabove near the first pitman and being somewhat out of phase with the first pitman circumferentially of the crank portion so that the first and second pitmans are never at dead center simultaneously with respect to the crank portion, a generally L-shaped vertically swingable foot operated rigid bell crank device pivoted intermediate its ends to said frame forwardly of said axle, said bell crank comprising a forwardly extending substantially horizontal part and an upstanding substantially vertical part rigid therewith and arranged forwardly of said pitmans, and a substantially horizontal rearwardly extending arm rigid with the top of said upstanding part of the bell crank device and projecting rearwardly of the pivot of the bell crank device and having its rear end pivoted to the top of said companion pitman for operating the latter.

3. A child's vehicle comprising a main frame, front steering wheel means including a substantially vertical rotatable steering column connected with the main frame, a rear driving axle including a crank portion connected with the main frame, rear wheels rotatably mounted upon and supporting said axle, movable clutch means associated with said axle and operable for engagement with the rear wheels for locking them to the axle for rotation therewith, a horizontally swingable element secured to said steering column for movement therewith, a short link pivoted to said element and swingable horizontally with respect thereto, a relatively long rod arranged substantially horizontally and having its forward end pivoted to said short link and its rear end pivoted to the main frame and having an upturned part near its forward end, a substantially horizontal link arranged above said rod and pivoted to the main frame and having an end portion to swing horizontally, a retractile spring secured to and connecting said end portion of the last-named link and said upturned part, a horizontally swingable crosshead secured to said substantially horizontal link to swing horizontally therewith, cable means secured to the ends of said crosshead and connected with the movable clutch means to actuate the latter when the steering column is turned, a body portion pivotally mounted upon the main frame for oscillation in a vertical plane, driving connecting means between the body portion and crank portion, and independent foot operated means connected with the crank portion for turning the latter in conjunction with said driving connecting means.

References Cited in the file of this patent

UNITED STATES PATENTS

| | | |
|---|---|---|
| 302,098 | Cardona | July 15, 1884 |
| 1,939,989 | Kopsco | Dec. 19, 1933 |
| 2,083,746 | Rumsey | June 15, 1937 |
| 2,224,689 | Middler | Dec. 10, 1940 |
| 2,236,196 | Middler | Mar. 25, 1941 |
| 2,511,968 | Card | June 20, 1950 |
| 2,626,161 | Thacker | Jan. 20, 1953 |
| 2,659,445 | Church | Nov. 17, 1953 |

FOREIGN PATENTS

| | | |
|---|---|---|
| 26,415 | Great Britain | Nov. 21, 1896 |